US008262950B1

(12) United States Patent
Nenoff et al.

(10) Patent No.: US 8,262,950 B1
(45) Date of Patent: Sep. 11, 2012

(54) LOW SINTERING TEMPERATURE GLASS WASTE FORMS FOR SEQUESTERING RADIOACTIVE IODINE

(75) Inventors: Tina M. Nenoff, Sandia Park, NM (US); James L. Krumhansl, Albuquerque, NM (US); Terry J. Garino, Albuquerque, NM (US); Nathan W. Ockwig, Spicer, NM (US)

(73) Assignee: Sandia Corporation, Albuquerque, NM (US)

( * ) Notice: Subject to any disclaimer, the term of this patent is extended or adjusted under 35 U.S.C. 154(b) by 87 days.

(21) Appl. No.: 12/727,353

(22) Filed: Mar. 19, 2010

Related U.S. Application Data

(63) Continuation-in-part of application No. 12/617,051, filed on Nov. 12, 2009.

(60) Provisional application No. 61/286,952, filed on Dec. 16, 2009, provisional application No. 61/114,113, filed on Nov. 13, 2008.

(51) Int. Cl.
*C09K 11/04* (2006.01)
*C09K 3/00* (2006.01)
*G21F 9/00* (2006.01)

(52) U.S. Cl. ... 252/625; 252/517; 252/634; 405/128.65; 405/129.2; 423/249; 588/14; 588/15; 588/16; 588/20; 976/DIG. 385; 976/DIG. 392

(58) Field of Classification Search ............... 252/625, 252/634, 517; 501/12; 588/2, 10, 11, 12, 588/15, 16, 20, 14; 75/247, 246; 405/128.65, 405/129.2; 423/249; 976/DIG. 385, DIG. 392
See application file for complete search history.

(56) References Cited

U.S. PATENT DOCUMENTS

| | | | |
|---|---|---|---|
| 4,017,417 A | 4/1977 | Clark et al. |
| 4,229,317 A | 10/1980 | Babad et al. |
| 5,352,367 A | 10/1994 | Ochiai et al. |
| 5,826,203 A | 10/1998 | Fukumoto et al. |
| 6,296,786 B1 | 10/2001 | Wada et al. |

OTHER PUBLICATIONS

Sakuragi, et al., Immobilization of Radioactive Iodine using AgI Vitrification Technique for the TRU . . . , Mater. Res. Soc. Symp. Proc., vol. 1107, 2008 pp. 279-285.
Sheppard, et al., Silver Zeolites: Iodide Occlusion and Conversion to Sodalite, Mater. Res. Soc. Symp. Proc., vol. 932, 2006 pp. 775-782.
Maddrel, E.R., Abraitis, P.K., Ceramic Wasteforrns for the Conditioningof Spent MOx Fuel Wastes, Mater. Res. Soc. Symp. Proc., vol. 807, 2004 pp. 231-236.
Nishi, T., et al., Applicability of V2O6-P2O5 Glass System for Low-Temperature Vitrification, Mater, Res, Soc. Symp. Proc., vol. 465, 1997 pp. 221-228.
Mobile Fission and Activation Products . . . , ISBN 978-92-64-99072-2,OCED 2009, NEA No. 6310, Nuclear Energy Agency,Workshop Proceedings,La Baule, France, Jan. 16-19, 2007.
Garino, et al., Development of Waste Forms for iodine using Low-Sintering Glass, Integrated Radioactive Waste Management in Future Fuel Cycles, Nov. 8-12, 2009. Charleston, SC.
Short Course Monograph: Intro. to Nuclear Chemistry and Fuel Cycle Separations, Vanderbilt Univ., School of Eng., CRESP, Nashville, TN, Dec. 16-18, 2008.
John D. Vienna, Waste Forms for an Advanced Fuel Cycle, CRESP Short Couse, Vanderbilt Univ., School of Eng., CRESP, Nashville, TN, Dec. 16-18, 2008.
Keller, et al, "The crystal structure of Bi4O5I2 and its relation to the structure of Bi4O5Br2", Z. Kristallogr. 217 (2002) 256-264.
Taylor, et al., "Stability of bismuth oxyiodides in aqueous solutions at 25° C.", Can. J. Chem. vol. 64, 1986.
Taylor, et al., "Bismuth Oxyiodide: A Candidate Waste Form for Iodine-129", Atomic Energy of Canada Limited, TR-350, pp. 375-386, Sep. 1985.
Taylor, et al., "Some phase relationships between basic bismuth chlorides in aqueous solutions at 25° C.", Can. J. Chem. vol. 65, 1987. pp. 2824-2829.
Eggenweiler, et al., "The crystal structure of alpha-Bi5O7I", Z. Kristallogr. 216 (2001) 230-233.
Nenoff et al., "Durable Materials for GNEP Iodine Waste Streams", NUCL 2008 Spring ACT meeting, New Orleans, LA, Apr. 10, 2008.
Nenoff et al., "Durable Materials for GNEP Iodine Waste Streams", American Nuclear Society, 2008 Spring Mtg., Anaheim, CA Jun. 11, 2008.
Nenoff et al., "In-Situ Formation of Bismuth-Based Iodine Waste Forms", Mater. Res. Soc. Symp. Proc. vol. 1043, 1043-T12-05, Dec. 1, 2007.
Nenoff et al., "Iodine Waste Form Summary Report (FY 2007)", Sandia National Laboratories, Sandia Report SAND2007-6202, Nov. 27, 2007.
Nenoff et al., "Novel Bismuth-Based Inorganic Oxide Waste Forms for Iodine Storage", Proc. Global 2009, Paris, France, Sep. 6-11, 2009, Paper 9ZZZ.

*Primary Examiner* — Bijan Ahvazi
(74) *Attorney, Agent, or Firm* — Daniel J. Jenkins

(57) ABSTRACT

Materials and methods of making low-sintering-temperature glass waste forms that sequester radioactive iodine in a strong and durable structure. First, the iodine is captured by an adsorbant, which forms an iodine-loaded material, e.g., AgI, AgI-zeolite, AgI-mordenite, Ag-silica aerogel, $ZnI_2$, CuI, or $Bi_5O_7I$. Next, particles of the iodine-loaded material are mixed with powdered frits of low-sintering-temperature glasses (comprising various oxides of Si, B, Bi, Pb, and Zn), and then sintered at a relatively low temperature, ranging from 425° C. to 550° C. The sintering converts the mixed powders into a solid block of a glassy waste form, having low iodine leaching rates. The vitrified glassy waste form can contain as much as 60 wt % AgI. A preferred glass, having a sintering temperature of 500° C. (below the silver iodide sublimation temperature of 500° C.) was identified that contains oxides of boron, bismuth, and zinc, while containing essentially no lead or silicon.

27 Claims, 15 Drawing Sheets

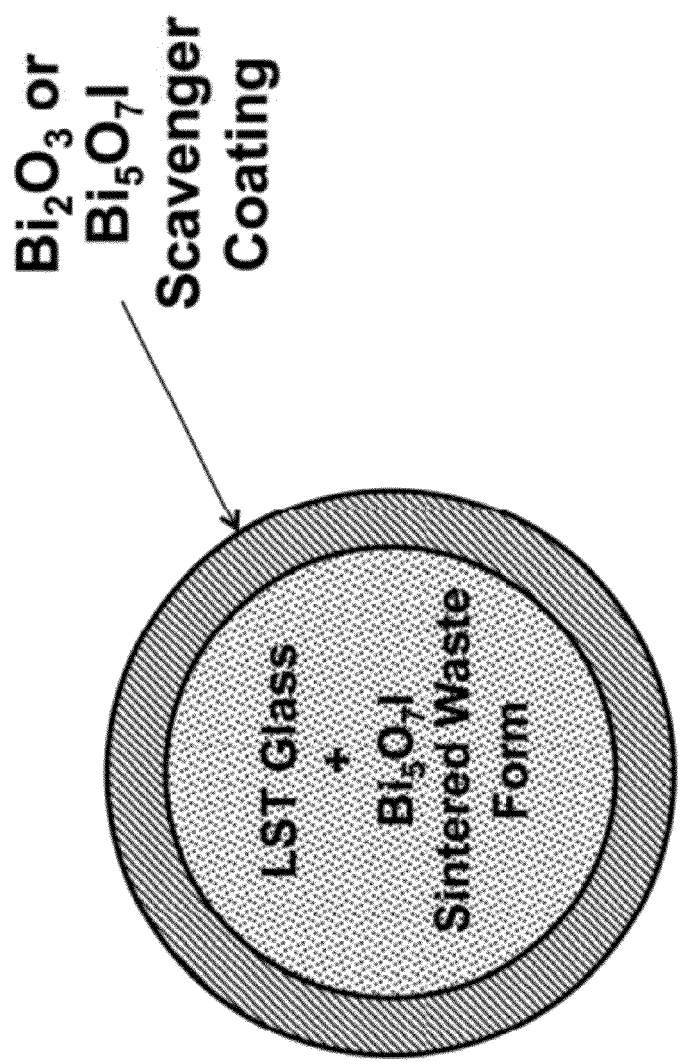

LOW SINTERING TEMPERATURE GLASS WASTE FORMS FOR SEQUESTERING RADIOACTIVE IODINE

CROSS-REFERENCE TO RELATED APPLICATIONS

This application claims priority to U.S. Provisional Application Ser. No. 61/286,952 filed Dec. 16, 2009, which is incorporated herein by reference. This application is also a Continuation-in-Part of co-pending U.S. patent application Ser. No. 12/617,051 filed Nov. 12, 2009, which itself claims priority to U.S. Provisional Application Ser. No. 61/114,113 filed Nov. 13, 2008. The disclosures of all of these related applications are incorporated herein by reference.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

The invention relates generally to methods and materials for sequestering and storage for disposal of radioactive iodine wastes from nuclear reactor fuel cycles and nuclear legacy wastes, as well as capture and immobilization of non-radioactive iodine species.

Radioactive $^{129}$I is one of the longer-lived fission products ($1.6 \times 10^7$ years) resulting from the generation of nuclear fuels and energy, and it is also one that is associated with considerable public concern by virtue of the mechanism whereby it may become concentrated in the human body. Historically, $^{129}$I was simply discharged to the atmosphere. Until recently, iodine is discharged to the ocean (principally the seas around Europe) for isotope dilution with the natural iodine in seawater.

With the growth of research on advanced fuel cycles in the United States and abroad, there is a strong interest in the separations and waste form development for all radioisotopes that are isolated in the developing nuclear cycles. This includes the initial trapping of gaseous iodine radioisotopes, and their incorporation into waste forms. During fuel reprocessing, the gaseous forms of radioiodine (principally $I_2$, $CH_3I$, HI, and HIO) must be captured in a form that is suitable for long-term storage. Whether wastes are slated for above ground storage, or underground burial, a serious need is that the radionuclides ($^{129}$I & $^{131}$I) exist in highly insoluble chemical forms that will not be readily dissolved should water gain access to the site.

A second major consideration is that the wastes not exist as powders, since an accident during storage or handling could produce a cloud of radioactive dust with the potential for causing widespread contamination.

Nuclear fuel reprocessing is a technology that has been under development for more than half a century. During normal reprocessing activities, as the fuel is dissolved from the nuclear fuel rods, most of the radio-iodine is liberated and leaves as elemental iodine vapor. An international consensus has developed that incorporating radioisotopes into borosilicate glass waste forms is a convenient and acceptable (though not necessarily optimal) technology. Iodine, however, remains a notable exception, because conventional glass waste forms do not retain the iodine.

At this time, the leading technology for capturing radioiodine from the reprocessing off-gases is sorption onto a silver-loaded zeolite matrix (where the iodine reacts with silver to form silver iodide, AgI). Recent studies at Sandia indicate that the iodine is sequestered in the form of sub-micron sized silver iodide (AgI) crystals on the internal and external surfaces of zeolite particles. One of our important research findings was that if the silver is loaded to the bulk surface (as opposed to ion exchanged into the zeolite pore), much of the iodine will be trapped on the bulk surface of the zeolite crystals, with only some of it in the channels and pores of zeolite crystal. Because of surface entrapment, mild heating causes easy release of the iodine as iodine gas. Additionally, zeolites are crushable metal oxides, and can easily form powders and dust if not protected from mechanical damage.

A different approach to solving this problem is to heat the silver-loaded zeolite matrix at a temperature sufficiently high (500-700° C.), with or without pressure, to collapse the porous framework and create a densified/sintered ceramic that retains the iodine as AgI. However, the sintering temperature cannot be so high as to cause sublimation of the AgI ($\approx 550°$ C.), causing subsequent release of gaseous iodine. Unfortunately, in recent tests, commercially available silver-loaded zeolites were sintered, but did not produce the expected sequestering result because too much iodine was released during processing (likely due to the surface entrapment effect).

Hence, a need exists for a highly stable binder or encapsulant material that securely sequesters particles of AgI or AgI-zeolite; and that has good mechanical strength, durability, low iodine outgassing, and low rates of leaching in groundwater.

SUMMARY OF THE INVENTION

The invention relates to materials and methods of making low-sintering-temperature (LST) glass waste forms that sequester radioactive iodine in a strong and durable structure. First, the iodine is captured by an adsorbant, which forms an iodine-loaded material, e.g., AgI, AgI-zeolite, AgI-mordenite, Ag-silica aerogel, $ZnI_2$, CuI, or $Bi_5O_7I$. Next, particles of the iodine-loaded material are mixed with powdered frits of low-sintering-temperature (LST) glasses (comprising various oxides of Si, B, Bi, Pb, and Zn), and then sintered at a relatively low temperature, ranging from 425° C. to 550° C. The sintering converts the mixed powders into a solid block of a glassy waste form, having low iodine leaching rates. The vitrified glassy waste form can contain as much as 60 wt % AgI. A preferred glass, having a sintering temperature of 500° C. (below the silver iodide sublimation temperature of 500° C.) was identified that primarily contains oxides of boron, bismuth, and zinc, while containing essentially no lead or silicon.

BRIEF DESCRIPTION OF THE DRAWINGS

The accompanying drawings, which are incorporated in and form part of the specification, illustrate various examples of the present invention and, together with the detailed description, serve to explain the principles of the invention.

FIG. 15 shows a schematic cross-section of a waste form comprising sintered Low-sintering-temperature glass and $Bi_xO_yI_z$, surrounded by a scavenger coating of bismuth-oxide, $Bi_2O_3$.

DETAILED DESCRIPTION OF THE INVENTION

Figure 1:
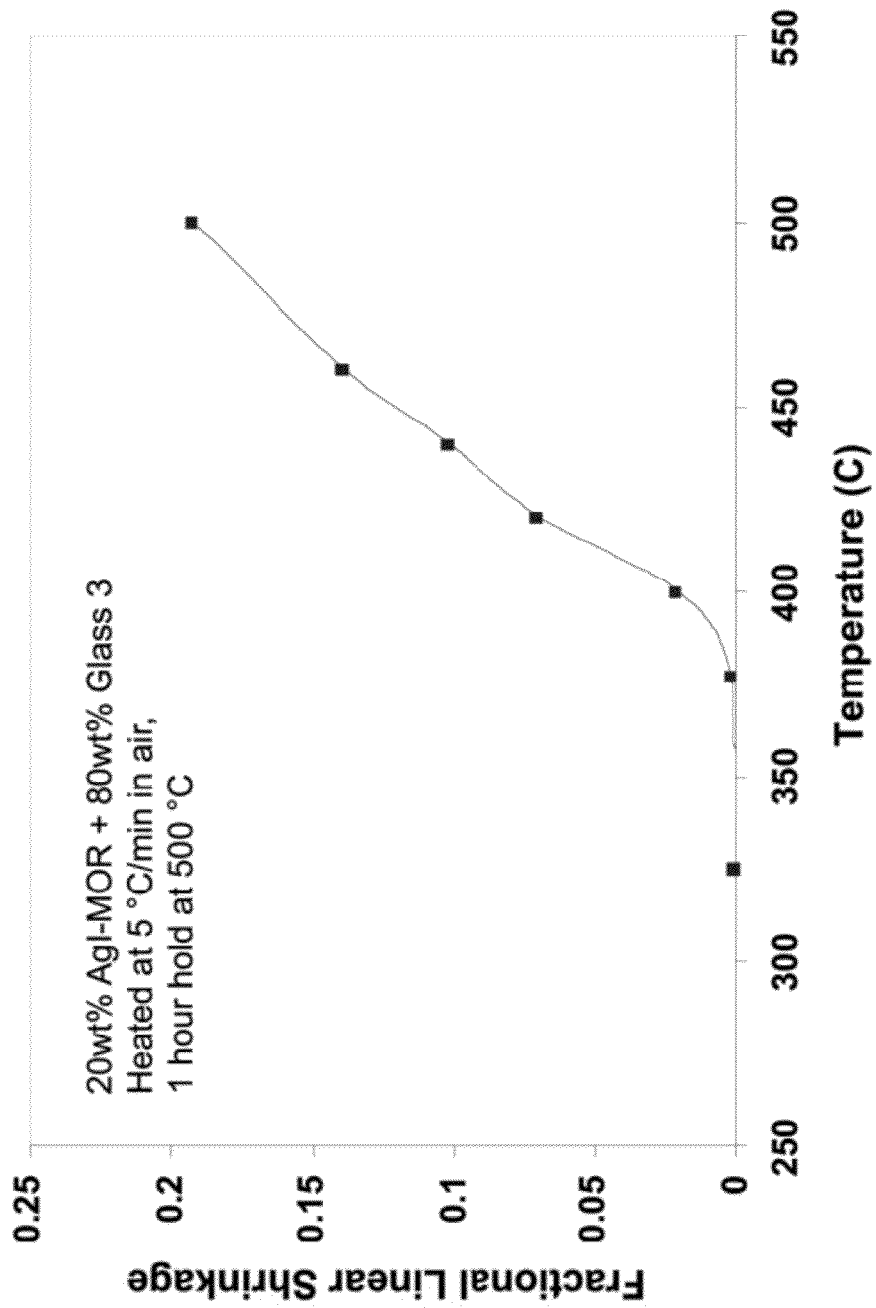
FIG. 1 shows a typical plot of glass powder shrinkage versus temperature when baking in air. After reaching the maximum sintering temperature (e.g., 500° C.), the sample is held there for 1 to 3 hours, followed by slow cooling to RT.

The present invention relates to materials and methods of synthesizing low-sintering-temperature (LST) glass waste forms for sequestering radioactive iodine. The terms "LST" and "LTG" both refer to low-sintering-temperature glass. Herein, we define the word "iodine" to broadly include both non-radioactive and radioactive isotopes of iodine.

Ag-Zeolite is a separations material that is highly selective for $I_2$ over other species produced during nuclear fuel reprocessing. If all the Ag is located inside the angstrom-sized zeolite pores (through ion exchange into the zeolite), the $I_2$ will react with it in the pores to form Ag—I. This Ag—I is chemisorbed and physisorbed in the material, and therefore bound in a stable form for long periods of time. However, if the Ag is impregnated onto the zeolite, much will be located on the bulk surface of the crystallites. Iodine reaction with the Ag will form AgI physisorbed on the surface. This is not physically trapped inside the zeolite cage, and is therefore in a less stable form. Commercially produced Ag-MOR (mordenite type of zeolite) is synthesized in the latter method. This indicates that additional processing steps may be needed to transform the Ag—I-MOR product of the waste trapping process into a waste form suitable for geologic disposal.

In general, two options exist for disposal of iodine vapor that has trapped inside a bed of silver-zeolite. One keeps the radioactive AgI inside the zeolite matrix and disposes of both of them together. The other removes the radioactive AgI from the zeolite, and disposes of the AgI separately. Our process handles both options.

AgI has very low solubility in water ($3\times10^{-6}$ g/L or $1.3\times10^{-8}$ mol/L at 20° C.), but has a relatively high vapor pressure. It undergoes a β to α phase change at 147° C., and it melts at 558° C. It has a vapor pressure of 10 mT at 600° C., which limits the thermal processing temperature to less than 600° C. Thermal gravimetric analysis confirms that AgI begins to volatilize appreciably above 600° C.

The basic process we developed involves making a mixture by mixing powdered frits of low-sintering-temperature glass with particles/powders of a iodine-loaded material (e.g., AgI or AgI-zeolite); followed by baking the mixture in air at a maximum temperature (i.e., sintering temperature) ranging from 425° C. to 550° C., which densifies the mixture into a solid, glassy body, after cooling to room temperature. Upon reaching the maximum temperature (i.e., sintering temperature), the samples are held there for a hold time, which typically ranges from 1 to 3 hours, followed by slow cooling to RT. The glassy solid body is called the "waste form" or "iodine-loaded waste form". The glassy body can comprise vitreous glass, amorphous glass, recrystallized glass, or mixtures of the various forms.

First, the iodine is captured in an "adsorbant" to produce an iodine-loaded material. Examples of adsorbants include Ag, Ag-zeolite, Ag-mordenite, Zn, Cu, and bismuth/oxygen compounds. Some examples of iodine-loaded material include: AgI, AgI on a zeolite substrate (Ag-zeolite), Ag-mordenite (Ag-MOR), Ag-silica aerogel (Ag-aerogel), $ZnI_2$, CuI, and a bismuth-oxy-iodine/iodide/iodate compound (e.g., $Bi_5O_7I$). The bismuth-oxy-iodine/iodide/iodate compound needs to have a thermal decomposition temperature greater than the sintering temperature of whatever LST glass is used.

Next, the iodine-loaded material is converted to particles or powders by, for example, crushing or grinding. Typical particle sizes are less than or equal to 50 microns. They can be <40 microns, and they can also range from about 20 to 40 microns in size. Next, the particles of iodine-loaded material are mixed with powdered frits of one or more low-sintering-temperature (LST) glass(s), followed by cold pressing into a pellet or block for easy handling. Note: the words "particles" and "powders" are used interchangeably and mean the same thing. Powder sizes for the glass frits can be in the range of 0.5 to 40 microns. The EG-2998 frit had an average particle size of 8 microns. In general, the smaller the particle size, the lower the sintering temperature. Some frits may have particle sizes down to about 0.5 microns.

Then, the pellet or block is baked (sintered) at an elevated temperature for a time sufficiently long to sinter and densify the mixture into a glassy solid body ("waste form"). Then, the sintered waste form is cooled slowly back down to room temperature. This sintering process is also called vitrification. The vitrified amorphous glass body serves as an encapsulant or binder to sequester, immobilize, and isolate the iodine from the environment.

The sequestered iodine can be homogeneously distributed (i.e., dissolved) within the glass. In other words, the iodine itself is part of the glass structure and is homogeneously taken into the vitrified material. Alternatively, in other embodiments, the iodine-loaded material can be inhomogeneously distributed within the glassy waste form.

The LST glasses can comprise various combinations of oxides of Si, B, Bi, Pb, and Zn (or other metals with chemistry similar to zinc, such as: Cu, Ga, Ge, Sn, Sb, Ca, P, Fe, and Al).

The LST glasses work in two different ways. They can mechanically encapsulate the iodine-loaded material with minimal actual chemical interaction with the iodine. Alternatively, the glass can dissolve the iodine-containing phase(s) present in (or on) the iodine-loaded material (e.g., AgI), so that now much of the iodine is actually dispersed homogeneously throughout the glass. The present invention covers both instances, because our key discovery was the unexpected fact that we have been able to demonstrate that various low-sintering-temperature glasses can be used to accomplish either objective.

These low-sintering-temperature binders/encapsulants sinter at temperatures below the sublimation temperature of AgI (558° C.), thereby allowing encapsulation to occur prior to losing AgI from zeolite surfaces due to sublimation. The resultant iodine-loaded glassy material can be in the form of large, cohesive blocks or ingots. Such blocks or ingots are suitable for long-term storage or geologic sequestration, without being concerned that the materials would be dispersed as a powder. Note that HIPing (Hot Isostatic Pressing) is not required to sinter these low-sintering-temperature glasses (LTG's), as they generally sinter at atmospheric pressure in the range of 425° C. to 550° C. (for example, 500° C.).

In the initial stages of development, we studied both crystallizing and non-crystallizing types of LTG glasses as binding agents for $I_2$, AgI, and AgI-MOR (mordenite, which has been exposed to iodine vapor). Exposure to iodine vapor is the closest mimic of the industrial conditions that this technology will be utilized in. Our first step in this experimental process was to do a literature search of low-sintering-temperature glass powders as possible waste forms for Iodine. Then we began by ordering commercially available glasses that fit our criteria of correct composition (based on our earlier research of iodine waste forms, and desirable glass transition temperatures). We identified and examined a suite of seven, boron-containing, LST glasses (crystallizing or non-crystallizing), with substantial variations in composition and sintering temperature. These commercially available glasses were acquired from Ferro Corporation (Cleveland, Ohio). We have subsequently synthesized our own low temperature glasses with variations on the previous compositions to form unique iodine encapsulants. The silver-loaded mordenite (Ag-MOR) was obtained from IONEX (IONEX-400), and the Na-LZM (Na-MOR) from UOP Corporation. Silver-Mordenite (Ag-MOR) has the chemical composition: $Ag_2Al_2Si_{10}O_{24} \cdot 7 (H_2O)$.

Silver nitrate and iodine were obtained and used as received from Aldrich, Co. Silver loading of the "as received" Na-LZM-5 was accomplished by doing an ion exchange process involving soaking the "as received" zeolite pellets in a saturated $AgNO_3$ solution overnight at 80° C. Gaseous iodine loading of samples occurred under a controlled atmosphere at 95° C. overnight, though typically complete saturation of the silver occurs within four hours.

The seven low sintering temperature oxide glasses obtained from Ferro Corporation were:
CF-1417, non-crystallizing, Pb—B—Al;
CF 7575, crystallizing, Pb—Zn—B, composite;
CF 7583, crystallizing, Pb—Zn—B;
CF 8463, non-crystallizing, Pb—B—Si;
EG 2928, crystallizing, Pb—Zn—B;
EG 2952, crystallizing, Bi—Si—B—Zn; and
EG 2998, crystallizing, Bi—Zn—B (Glass #3).
Table 1 lists their chemical compositions, in weight percentages.

TABLE 1

Low-sintering-temperature Glass Compositions

| Glass ID | Form | Composition (in weight %) |
|---|---|---|
| CF 1417 | NC | Si, 14.33%; Pb, 52.48%; Al,13.66 %; Remainder B and O |

TABLE 1-continued

Low-sintering-temperature Glass Compositions

| Glass ID | Form | Composition (in weight %) |
|---|---|---|
| CF 7575 | C | Si, 27.98%; Pb, 43.18%; Zn, 23.11 %; Remainder B, C, and O |
| CF 7583 | C | Si, 5.33%; Pb, 47.24%; Zn, 17.65 %; Remainder B and O |
| CF 8463 | NC | Si, 38.99%; Pb, 48.53%; Remainder B and O |
| EG 2928 | C | Pb, 52.71%; Zn, 23.46 %; Remainder B and O |
| EG 2952 | C | Si, 11.46%; Bi, 37.46%; Zn, 22.17 %; Remainder B and O |
| EG 2998 | C | Bi, 51-55%; Zn, 21-22 %; B, 3-4%, Remainder O |

NC = non-crystallizng; C = crystallizing

Based on analysis by Galbraith, Ferro EG 2998 glass has the following equivalent compositions (in different measures):

as elemental mass %: 54.5 Bi; 22.4 Zn, 3.5 B; 19.7 O as elemental mole %: 12.1 Bi; 15.8 Zn, 15.1 B; 57.0 O as oxide mass %: 60.7 $Bi_2O_3$; 27.8 ZnO and 11.3 $B_2O_3$ as oxide mole %: 21.3 $Bi_2O_3$; 55.8 ZnO and 23.0 $B_2O_3$

TABLE 2 lists the recommended sintering (firing) temperatures for the seven glasses.

| Glass # | Composition | Crystallizing? | Firing Temperature (° C.) |
|---|---|---|---|
| 1 | Bi—B—Zn—Si | No | 550° |
| 2 | Bi—Si—B—Zn | Yes | 480° |
| 3 | Bi—Zn—B | Yes | 500° |
| 4 | Pb—Zn—B | Yes | 500° |
| 5 | Pb—B—Al | No | 487° |
| 6 | Pb—Zn—B | Yes | 450° |
| 7 | Pb—B—Si | No | 425° |

With respect to Glass #3, bismuth oxide ($Bi_2O_3$, the primary phase that Glass #3 forms upon crystallization . . . ) is quite insoluble in basic aqueous solution. Also, $Bi_2O_3$ is much less soluble than lead oxide (PbO). Therefore, Glass #3 is a preferred composition because it has superior densification behavior, and has no silicon or lead (Pb). This glass is also a model for glasses with the same metals, but in varying stoichiometries.

We performed detailed characterizations of the materials synthesized. Consequently, a wide variety of in-house analytical capabilities were employed: (1) Orion specific ion electrode, (2) PerkinElmer Elan 6100 ICP-MS (3) X-ray fluorescence ARL (Thermo) QUANT'X EDXRF Analyzer, (4) TA Instruments STD Q666 Simultaneous DTA-TGA, (5) Powder X-ray (XRD) Bruker AXS-D8 Advance powder diffractometer. Leaching studies were patterned after the PCT method (an STM standardized leach test method) in which samples were placed in deionized water, and heated at 90° C. for ≈24 hours in a screw-top polyethylene container. The resultant liquid was analyzed either by ICP-MS, or iodide-specific ion electrode, for leached Iodine. Solution acidity was measured in cooled solutions using a standard combination pH electrode.

The identity of Ag-MOR (IONEX-400), and in-house produced Ag-MOR, was confirmed by X-ray powder diffraction. No secondary phases were observed. The commercial material was visually biphasic. The white phase was identified as Ag-MOR, which contained an unidentified binder. The grey phase was also identified as Ag-MOR. However, the grey color is a direct result of a surface coating of reduced (i.e. metallic) silver particles.

Silver loaded mordenite (Ag-MOR) was synthetically produced in our lab using the following procedure: 10.0 g of sodium mordenite (UOP; LZM-5Na) was placed in a 0.1 M aqueous solution of silver nitrate and brought to reflux with stirring for 24 hr. This first exchange removed roughly 75% of the sodium ions, which were replaced with silver ions. The procedure was repeated a second time to yield 10.0 g of Ag-MOR with <1% sodium remaining. The material was dried at 115° C. for 24 hrs.

Iodine Ag-MOR reactivity was also investigated using the Ag-MOR after it had been reduced under a $H_2$ atmosphere. This sample is denoted as "$Ag^0$-MOR" in the subsequent data in this document.

Next, iodine was loaded into the zeolite samples through the following procedure. The zeolite sample was placed in a glass vessel that was loaded with a charge of elemental iodine. The amount of iodine was limited to 50% of the total molar content of silver ions in the Ag-MOR. This was done to avoid any possibility of saturating the Ag-MOR beyond its maximum theoretical sequestration capacity. Each of four LST glasses was loaded at 25% (w/w) capacity with each of the in-house MOR types (Na-MOR, Ag-MOR, and $Ag^0$-MOR) and then sintered at their recommended temperatures (see Table 2). Note: initially a batch process was explored, but it was discovered that lead (Pb) vapor had penetrated all of the sintering samples in the same chamber. Thereafter, each sample was sintered separately.

Pellets for sintering were produced as follows: 1.0 g of the desired material was finely ground (if not a powder already). 100 microliters of deionized water was added and used to form a paste that was placed in a 0.5 in. diameter die with Teflon coated faces. A pressure of 2000 psi was applied for 1.0 minute, and the cold-pressed pellet removed from the die. This cold-pressed pellet was then fired at 500° C. for 20 minutes to produce a sintered pellet.

Samples were prepared by sintering various mixtures of glass powder and AgI-MOR or AgI. Non-radioactive iodine was used.

In one example, KI-loaded (i.e., ion exchanged) Ag-MOR (Ionex Corp.) was ground to −400 mesh (<37 μm), then AgI powder (or ground AgI-MOR powder) was mixed with Glass #3 powder. Then, pellets (3.2 cm in diameter) were cold-pressed without binder. Finally, the pellets were heated in air at 5° C./min to 500° C. for 1 to 3 hr. Some properties of Glass #3 are listed in Table 3:

TABLE 3

Properties of Glass #3 (Ferro)

| Property | Value |
| --- | --- |
| Composition | Bi—Zn—B oxide |
| Recommended Sintering Conditions | 500° C. for 15 min |
| Coefficient of Thermal Expansion | $8.8 \times 10^{-6}/°$ C. |
| Density | 5.71 g/cm³ |
| Mean Particle Size | 8 μm |

We identified the resultant crystalline phases after sintering the LST glasses. This is shown in Table 4.

TABLE 4

Identified Crystalline Phases After Sintering of LTG's.

| Glass | Form | Phases |
| --- | --- | --- |
| CF 1417 | NC | N/A |
| CF 7575 | C | $PbSiO_4$ - Lead analog of zircon |
| | | $PbZnSiO_4$ - Larsenite |
| | | $Zn_2SiO_4$ - Zinc Silicate |
| | | $B_2O_3$ - Boron Oxide |
| CF 7583 | C | $PbSiO_4$ - Lead analog of zircon |
| | | $PbO_2$ - Plattnerite |
| | | $PbZnSiO_4$ - Larsenite |
| | | $Ca_2B_5SiO_9(OH)_5$ - Howlite |
| CF 8463 | NC | N/A |
| EG 2928 | C | $Zn_2SiO_4$ - Willemite |
| | | $PbZn_2B_2O_6$ - Lead Zinc Borate |
| EG 2952 | C | $Bi_4(SiO_4)_3$ - Eulytite |
| | | $Bi_4B_2O_9$ - Bismuth Borate |
| | | $Bi_{38}ZnO_{58}$ - Zinc Bismuth Oxide |
| | | $Bi_2O_2SiO_3$ - Bismuth Oxide Silicate |
| EG 2998 | C | structure like $Bi_{12}SiO_{20}$ - Sillenite (+ derivatives) |
| | | structure like $Zn_2SiO_4$ - Willemite |
| | | $Zn_3B_2O_6$ - Zinc Borate |

NC = non-crystallizng; C = crystallizing

Table 5 lists elemental compositions (in weight %) of the zeolite materials.

TABLE 5

Zeolite Elemental Compositions in wt %

| Commercial Ag-MOR | Na | Mg | Al | Si | Ag | I |
| --- | --- | --- | --- | --- | --- | --- |
| IONEX-400 (grey) | 0.96 | 1.04 | 14.27 | 71.19 | 8.38 | — |
| IONEX-400 (white) | 2.19 | 0.46 | 34.71 | 48.65 | 13.48 | — |
| IONEX-400-grey-$I_2$ | 1.24 | 2.78 | 14.28 | 69.39 | 7.85 | 0.87 |
| IONEX-400-white-$I_2$ | 1.23 | 0.50 | 33.23 | 50.42 | 12.38 | 1.98 |

| In-house Ag-MOR | Na | Al | Si | Ag | I | Formula |
| --- | --- | --- | --- | --- | --- | --- |
| Na-MOR | 9.47 | 11.12 | 79.41 | 0 | 0 | Ag 0.00, Na 1.50, Al 1.50, Si 10.29 |
| Na-MOR-$I_2$ | 7.24 | 8.61 | 62.00 | 0 | 22.15 | Ag 0.00, I 0.82, Na 1.48, Al 1.50, Si 10.37 |
| Ag-MOR | 0.28 | 8.24 | 57.65 | 33.83 | 0 | Ag 1.54, Na 0.06, Al 1.51, Si 10.08 |
| Ag-MOR-$I_2$ | 0.24 | 7.01 | 50.60 | 26.54 | 15.61 | Ag 1.42, I 0.71, Na 0.06, Al 1.49, Si 10.40 |
| $Ag^0$-MOR | 0.33 | 8.27 | 59.20 | 32.20 | 0 | Ag 1.46, Na 0.07, Al 1.50, Si 10.31 |
| $Ag^0$-MOR-$I_2$ | 0.15 | 6.82 | 48.82 | 26.89 | 17.31 | Ag 1.48, I 0.81, Na 0.04, Al 1.50, Si 10.32 |

Table 6 lists elemental compositions (by wt %) of sintered AgI-Zeolite/LTG mixtures (Loaded at 25 wt/wt % AgI-MOR plus LTG):

TABLE 6

AgI-Zeolite/LTG Compositions
(Loaded at 25% w/w AgI-MOR/LTG)

| Zeolite | LTG | Na | Al | Si | Ag | Bi | Pb | Zn | I |
|---|---|---|---|---|---|---|---|---|---|
| Na-MOR | CF 1417 (NC) | 2.44 | 5.32 | 30.29 | 8.01 | — | 28.40 | — | 3.94 |
| Na-MOR | EG 2928 (C) | 2.32 | 3.63 | 26.60 | 7.95 | — | 21.16 | 23.18 | 3.97 |
| Na-MOR | EG 2998 (C) | 2.98 | 4.12 | 27.31 | 7.61 | 43.50 | — | 15.23 | 3.62 |
| Na-MOR | CF 8463 (NC) | 3.64 | 5.66 | 38.64 | 7.79 | — | 23.61 | — | 3.48 |
| Ag-MOR | CF 1417 (NC) | 0.09 | 7.09 | 21.75 | 5.09 | — | 24.46 | — | 2.16 |
| Ag-MOR | EG 2928 (C) | 0.08 | 3.39 | 17.95 | 9.50 | — | 28.34 | 20.68 | 4.91 |
| Ag-MOR | EG 2998 (C) | 0.09 | 3.95 | 18.04 | 9.91 | 45.01 | — | 17.93 | 5.05 |
| Ag-MOR | CF 8463 (NC) | 0.07 | 7.48 | 33.20 | 8.37 | — | 32.63 | — | 4.56 |
| $Ag^0$-MOR | CF 1417 (NC) | 0.06 | 6.94 | 20.41 | 10.92 | — | 36.19 | — | 6.07 |
| $Ag^0$-MOR | EG 2928 (C) | 0.09 | 3.25 | 16.61 | 8.41 | — | 39.13 | 22.60 | 4.76 |
| $Ag^0$-MOR | EG 2998 (C) | 0.08 | 2.99 | 16.72 | 8.30 | 44.61 | — | 21.10 | 4.38 |
| $Ag^0$-MOR | CF 8463 (NC) | 0.09 | 4.78 | 26.54 | 14.65 | — | 31.84 | — | 7.71 |

NC = non-crystallizing; C = crystallizing

FIG. 1 shows a densification plot of fractional linear shrinkage versus temperature of glass powder #3 densified with 20 wt % AgI-MOR. The sample was heated at 5° C./min in air. Densification starts around 400° C., and is essentially complete by 500° C. After reaching 500° C., the sample was held at that temperature (i.e., at the sintering temperature) for 1 hour, followed by slow cooling back down to RT. After sintering, the pellets were dense and crack-free.

Figure 2:
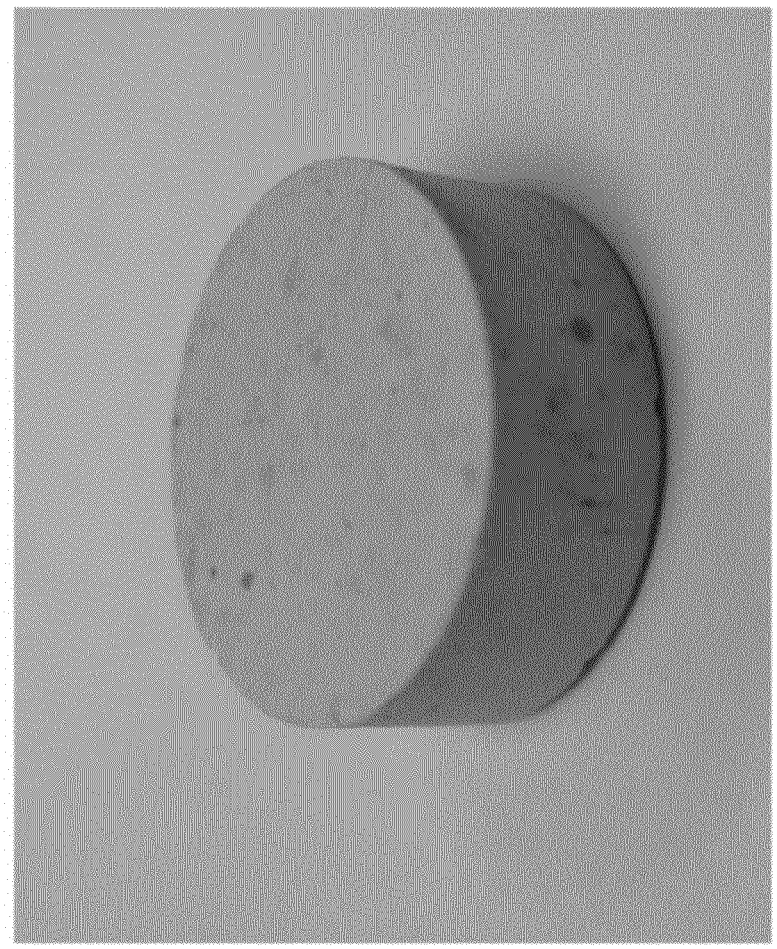
FIG. 2 shows a photograph of a Glass 3 sample containing 20 wt % AgI-Mordenite, after sintering at 500° C. for 1 hour.

FIG. 2 shows a densified disk of 20 wt % AgI-MOR/80 wt % Glass 3 after sintering at 500° C. for 1 hr. In this sample, the zeolite (mordenite) particle size was <40 microns before being sintered.

Figure 3:
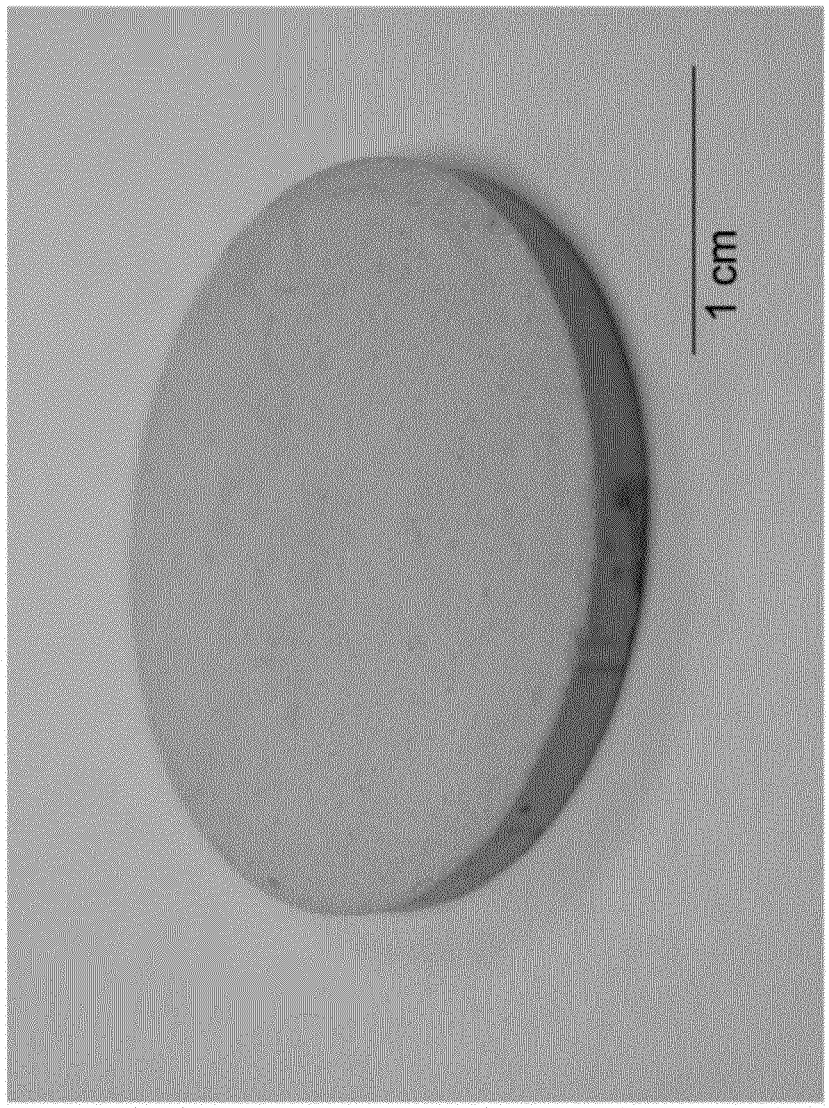
FIG. 3 shows a photograph of a Glass 3 sample containing 50 wt % AgI, after sintering at 500° C. for 3 hours.

FIG. 3 shows a densified disk of 50 wt % AgI/50 wt % Glass 3 after sintering at 500° C. for 3 hr. Normal densification occurred with AgI loadings as high as 50 wt % AgI (the highest concentration tested). In this sample, the AgI particle size was in the 20 to 40 micron range before being sintered.

Figure 4:
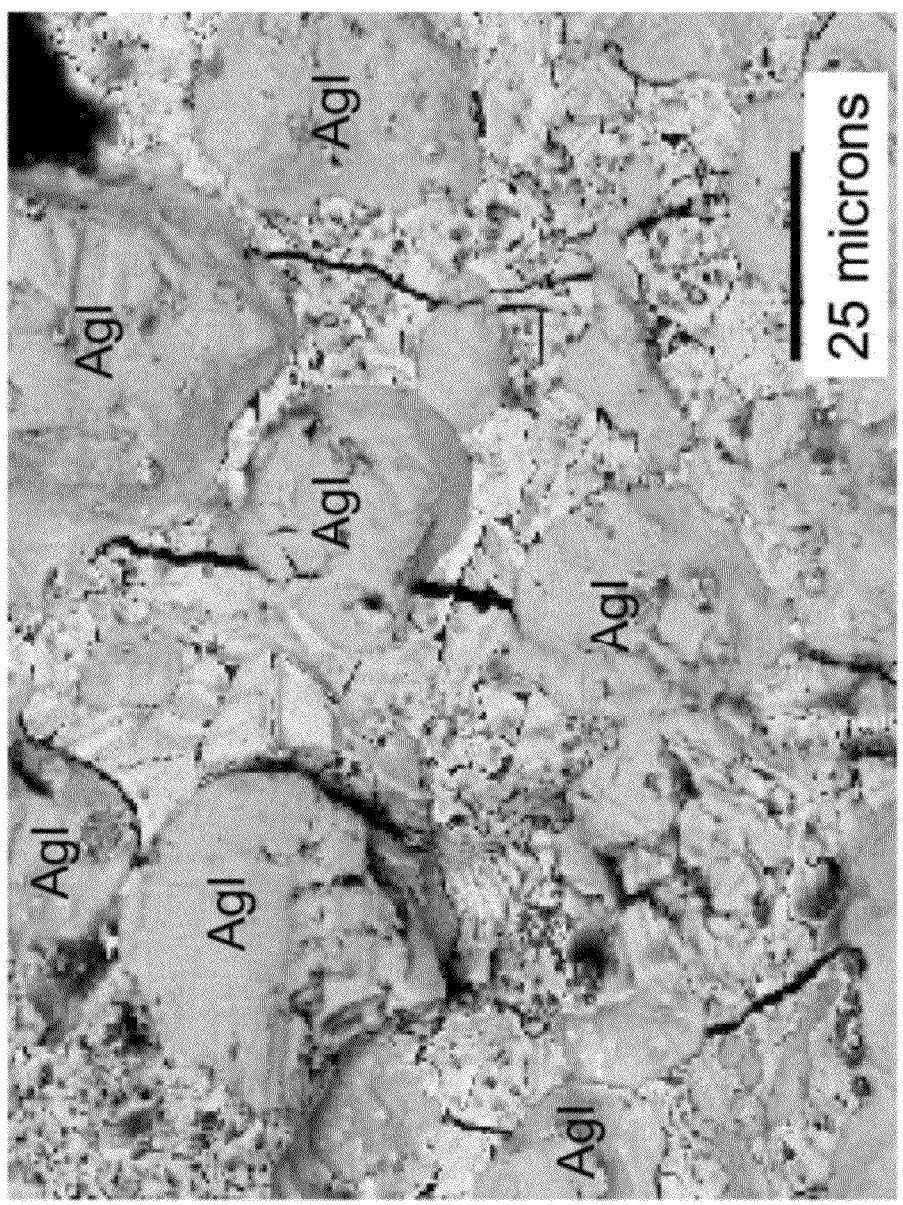
FIG. 4 shows a SEM micrograph of a Glass 3 sample containing 50 wt % AgI, after sintering at 500° C. for 3 hours.

FIG. 4 shows a magnified SEM image of 50 wt % AgI/50 wt % Glass 3 after sintering at 500° C. for 3 hr. The AgI particles are surrounded by a crystalline matrix containing a Bi-rich phase. Cracks in the Bi-phase are most likely due to mismatch in thermal expansion coefficients (note: β-AgI has a negative CTE). Subsequent testing confirmed that these cracks did not lead to any significant leaching of iodine during PCT testing.

Figure 5:
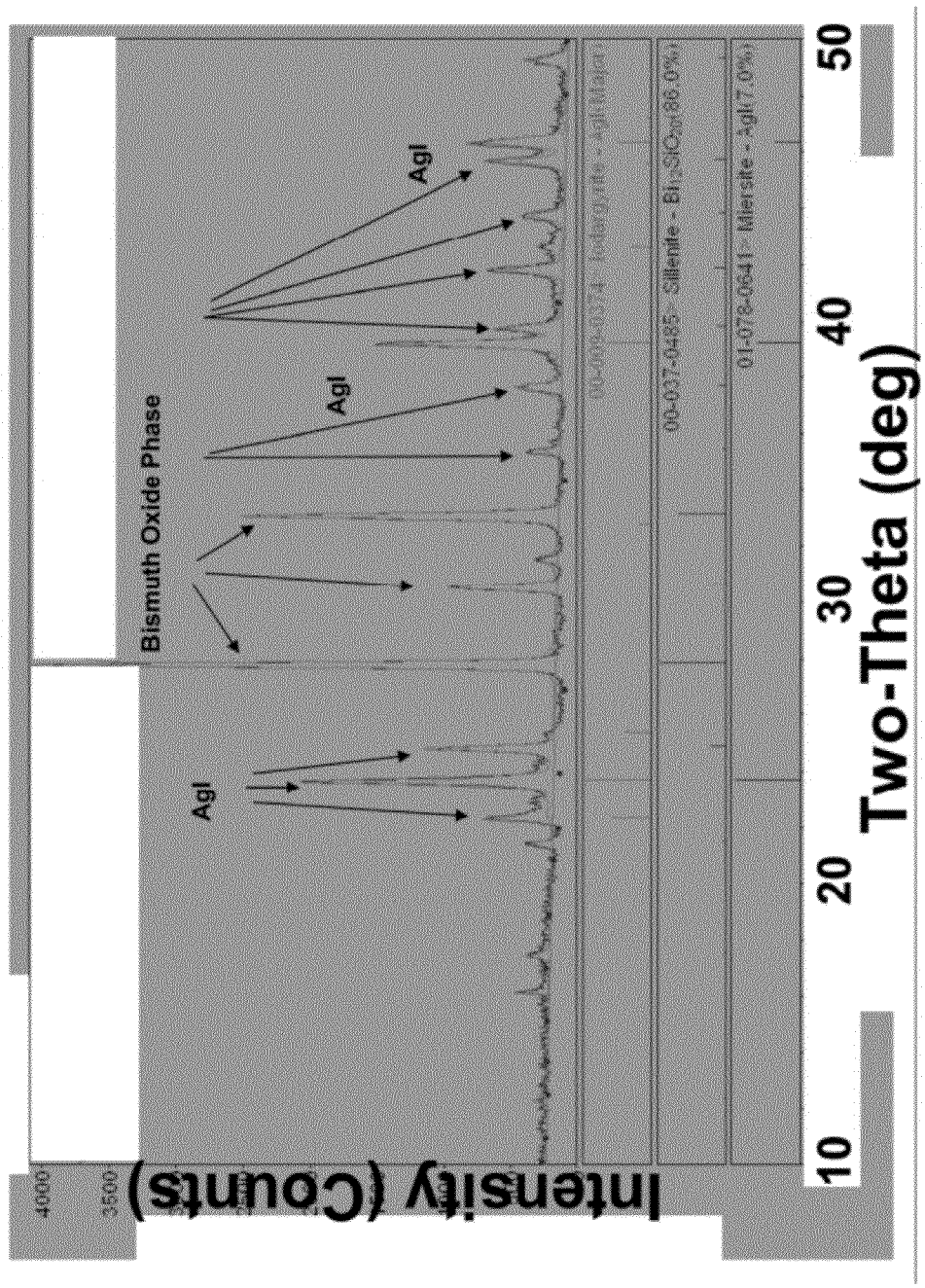
FIG. 5 shows an X-Ray diffraction pattern for the sample shown in FIG. 4.

FIG. 5 shows the X-ray diffraction pattern for that material, with peaks identifying AgI phases and Bismuth Oxide phases.

Figure 6:
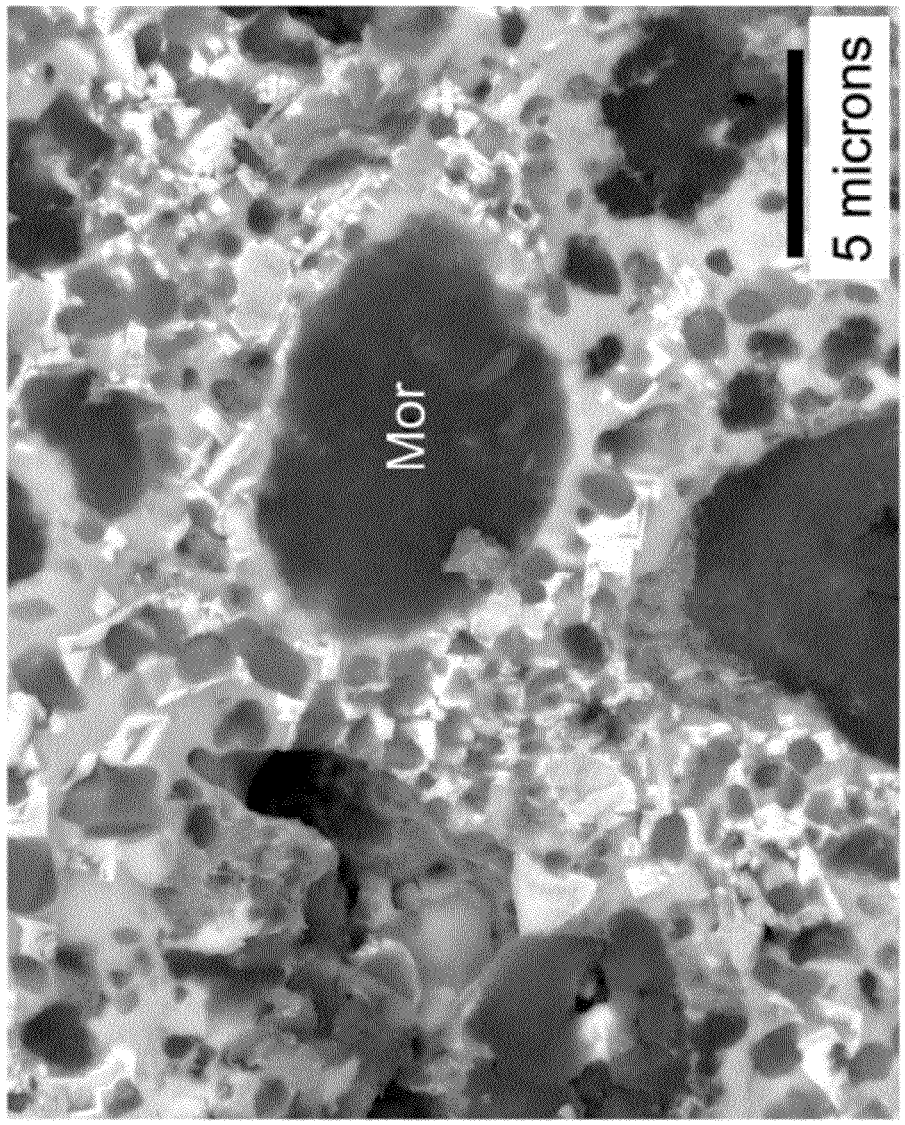
FIG. 6 shows a SEM micrograph of a Glass 3 sample containing 20 wt % AgI-Mordenite, after sintering at 500° C. for 1 hour.

FIG. 6 shows a magnified SEM image of 20 wt % AgI-MOR/80 wt % Glass 3 after sintering at 500° C. for 1 hr. The remnants of the MOR particles were no longer crystalline, but were surrounded by the crystallized Glass 3. The AgI was not located only in the MOR regions.

Figure 7:
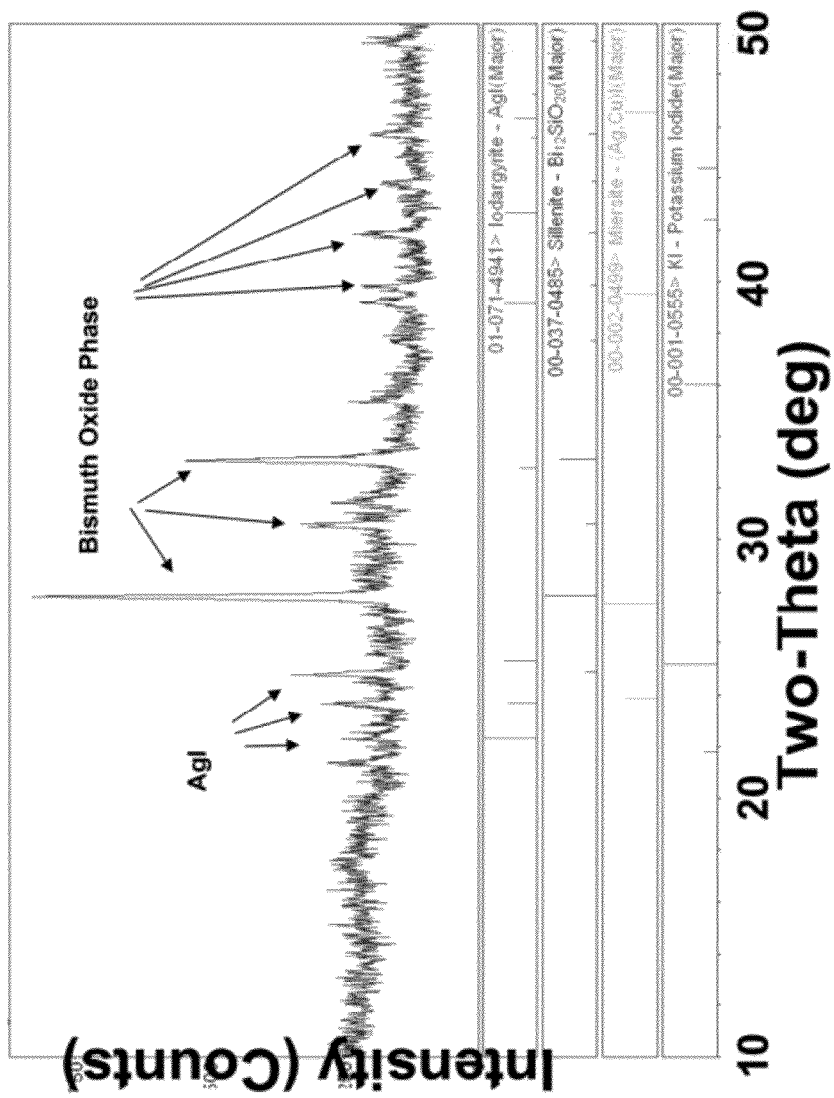
FIG. 7 shows an X-Ray diffraction pattern for the sample shown in FIG. 6.

FIG. 7 shows the X-ray diffraction pattern for that material, with peaks identifying AgI phases and Bismuth Oxide phases.

The concentration of AgI in the glassy waste form can range from 10 wt % to 60 wt %; with a preferred concentration ranging from 20 wt % to 50 wt %. Alternatively, the concentration of AgI-zeolite in the glassy waste form can range from 10 wt % to 30 wt %; with a preferred concentration ranging from 15 wt % to 25 wt %. Different concentrations may be of particular value for low iodine-loaded samples.

Figure 8:
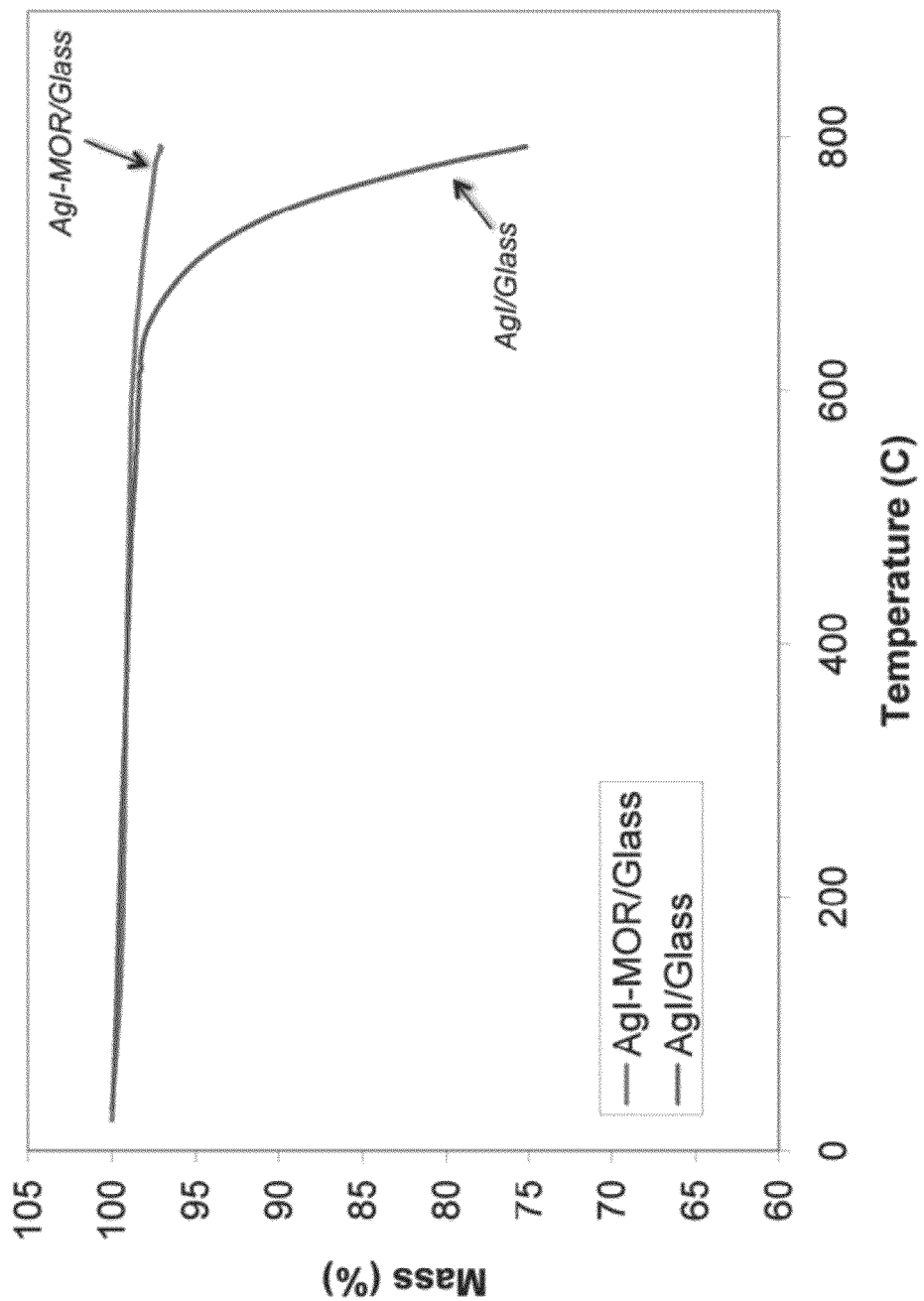
FIG. 8 shows mass loss as a function of temperature for AgI/Glass #3 and AgI-MOR/Glass #3 waste forms.
Figure 9:
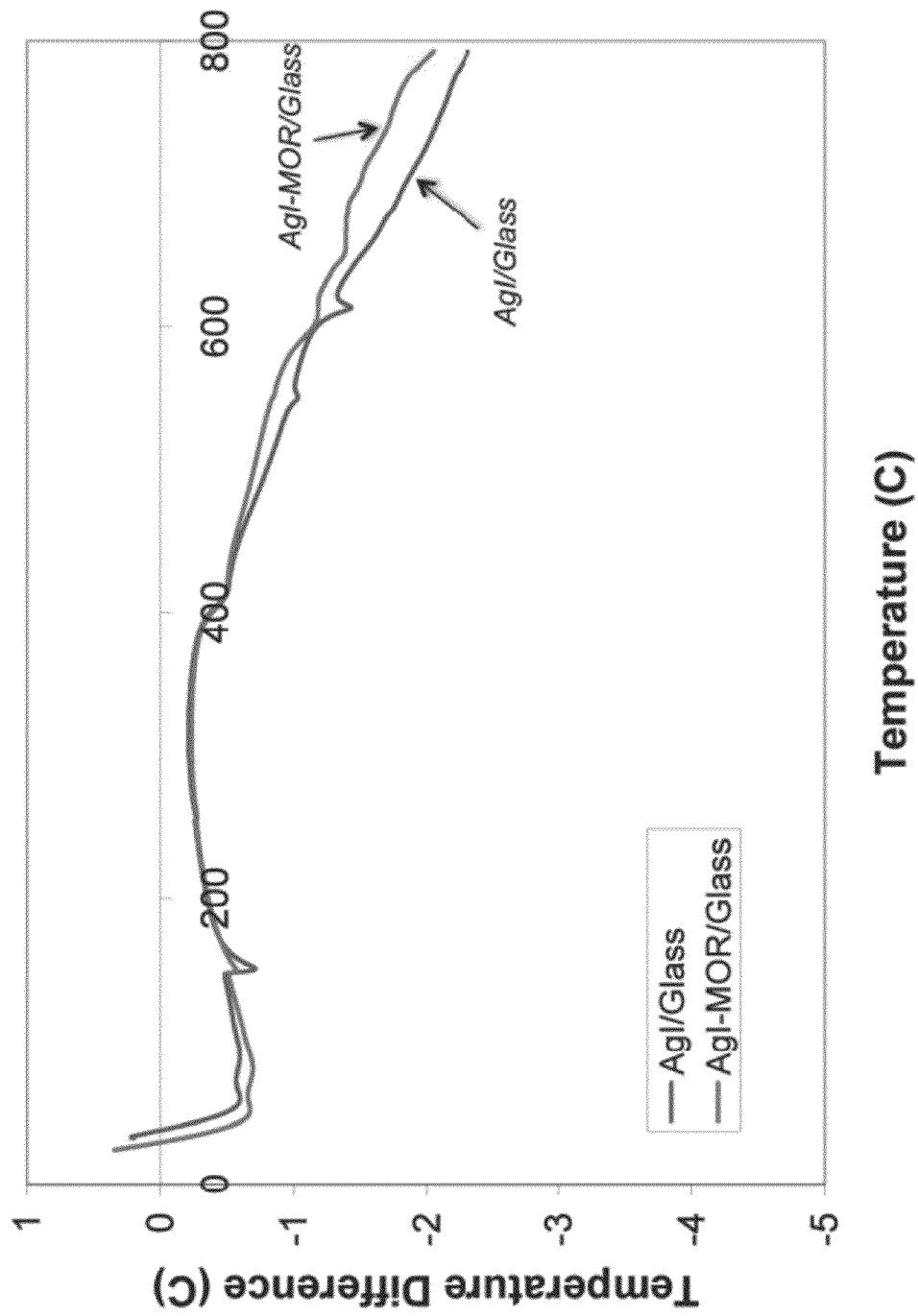
FIG. 9 shows temperature difference as a function of temperature for AgI/Glass #3 and AgI-MOR/Glass #3 waste form samples, corresponding to the test data of FIG. 8.

Thermal decomposition studies were performed on sintered Glass 3 loaded with AgI or AgI-MOR (See FIGS. 8 and 9). Thermogravimetric analysis of these sintered samples indicated they were thermally stable to >700° C. Therefore, it is possible that a slightly higher sintering temperature (e.g., 610-650° C.) may result in a better performing glass that is less soluble.

Figure 10:
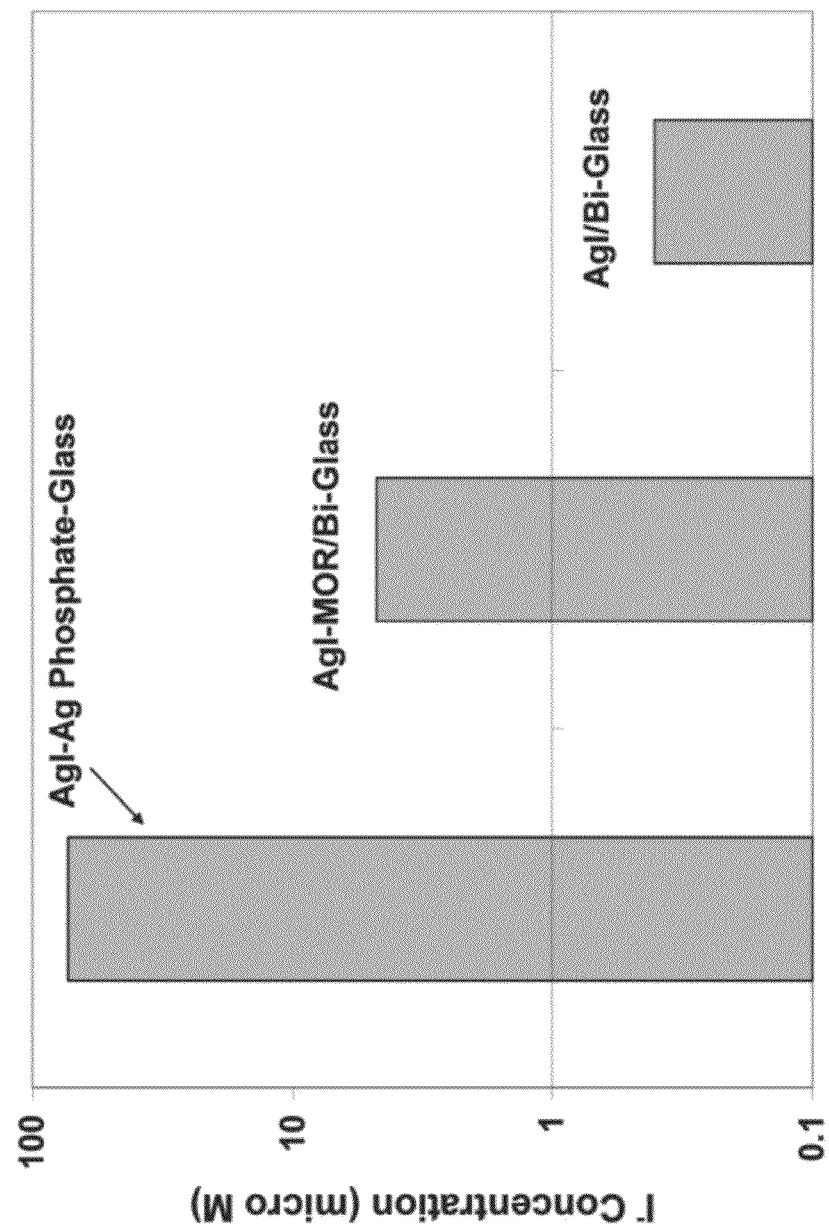
FIG. 10 shows results of iodine PCT leaching test in DI water at 90° C. for 1 week, for three different AgI waste forms.

Accelerated aqueous leaching tests were performed to investigate waste form durability. PCT (Product Consistency Test, ASTM Designation: C 1285—02) test (90° C. for 1 week in DI Water) was done on crushed, post-sintered material. The I⁻ concentration in the leachate was measured via an I⁻-specific electrode. FIG. 10 shows the results. The AgI/Glass 3 sample (AgI/Bi-Glass) had the lowest I⁻ concentration, which means that this material had the greatest resistance to iodine leaching in hot water (approximately 100× less iodine leaching than the AgI—Ag Phosphate-Glass sample, and approximately 10× less iodine leaching than the AgI-MOR/Bi-Glass sample). The AgI/Glass #3 sample (AgI/Bi-Glass) was prepared by vapor loading silver powder with iodine vapor, and then heating to 500° C. to drive off any chemically adsorbed iodine, leaving AgI behind; this was then mixed with the glass #3 and sintered. The AgI—Ag Phosphate-Glass sample was prepared according to the method of Sakuragi, et al., in "*Immobilization of Radioactive Iodine Using AgI Vitrification Technique for the TRU Wastes Disposal: Evaluation of Leaching and Surface Properties*", Mater. Res. Soc. Symp. Proc., Vol. 1107, 2008 Materials Research Society.

In summary, a new potential $^{129}$I waste form comprising AgI or AgI-zeolite bound with a LST glass was developed. Dense samples were sintered at 500° C. without hot-pressing. The resultant materials did not lose substantial mass until >700° C. Initial leach test results for iodine were promising, for both the AgI/glass and the AgI-MOR/glass waste forms. Finally, a preferred, lead-free, silicon-free, LST glass composition range was found, which contains Bi, Zn, and B oxides (with the primary phase that forms upon crystallization being $Bi_2O_3$).

As a side note to Ag-MOR processing, if the Ag in the Ag-MOR has not been properly reduced, much of the iodine does not form AgI, but is present as volatile elemental iodine. A preferred treatment involves three steps:

1) 4 hr at 300° C. in inert gas to remove residual air and moisture;
2) 24 hr at 500° C. in $H_2$ to convert ionic $Ag^+$ to metallic $Ag^0$; and
3) purging with flowing Ar to remove residual $H_2$ After sintering, the waste form that used "EG 2998" (Bi/Zn) glass performed best, showing no discrete phases; and the zeolite phases were fully incorporated (dissolved) into the sintered form of the crystallizing low-sintering-temperature glass. The waste form that used "CF 8463" (Pb) glass performed somewhat worse, because the zeolite particles appear to be wetted by the flux (although not entirely incorporated).

The waste forms that used "CF 1417" (Pb) and "EG 2928" (Pb/Zn) glasses did not appear to provide adequate flux, since there were discrete phases identified and observed by SEM.

Figure 11:
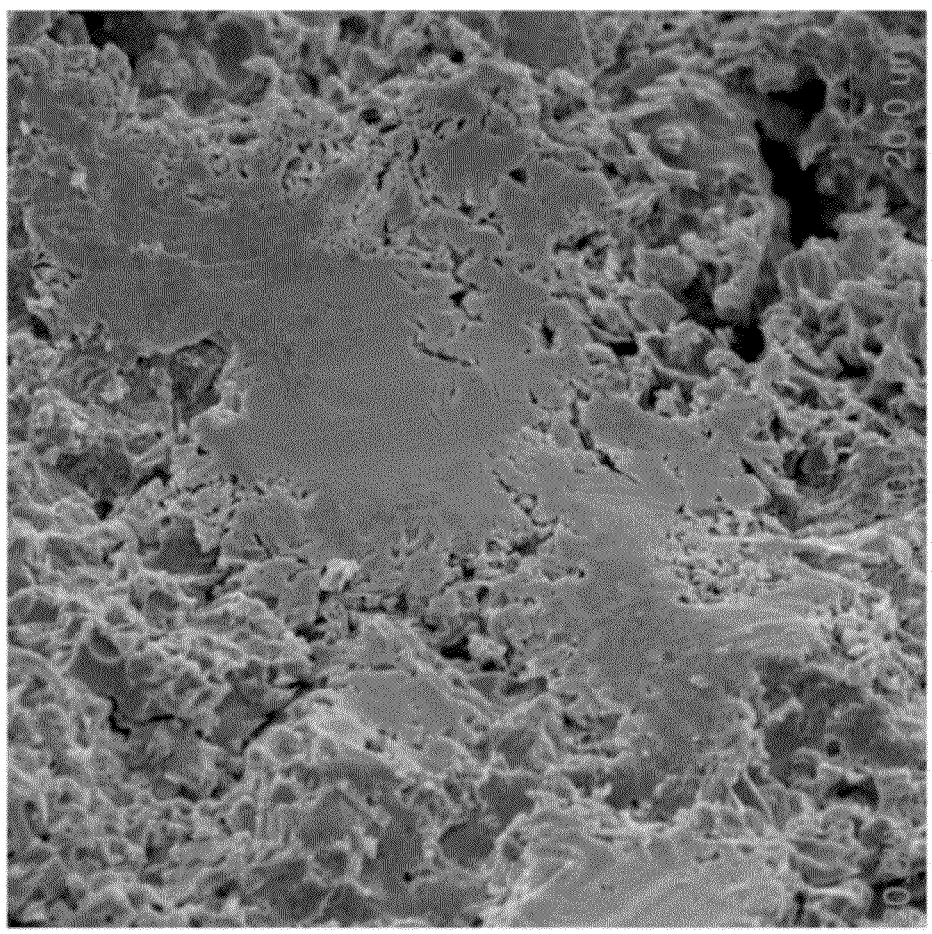
FIG. 11 shows a SEM micrograph of a Glass 3 sample containing 50 wt % AgI, after sintering at 500° C. for 3 hours. The SEM photo was taken at low magnification (500×) to show a large glassy region.

Initial studies were carried out on AgI-loaded glasses made according to the procedures described above. A quick survey of the data indicated that Bismuth-containing glasses had very encouraging initial results. Though there are porosity variations in the glass samples, the Bi containing glass seem to have fluxed (i.e., dissolved) the AgI, resulting in almost no evidence of individual AgI crystals formation (as observed by SEM, see FIG. 11). Instead, both the iodine and Ag seem to have been dissolved/incorporated in the glass. In contrast, the lead-containing glasses formed aggregates of (essentially) AgI-free glassy regions, and porous domains with a high proportion of AgI crystals. This inhomogeneous microstructure raises durability concerns with using these glasses as waste forms, because the iodine (as AgI) is not encapsulated by glass.

In some embodiments of the invention, fluxing ingredients other than boron can be used in these LST glasses, e.g., fluoride, phosphate, or fluoride phosphate.

All of the low-sintering-temperature glasses compositions we examined contained heavy elements, such as Pb, Bi, or Zn. As such, the LST glass itself may exhibit significant reactions upon exposure to I2 vapor. Initial investigations revealed that the LST glasses do indeed react with elemental $I_2$ vapor to produce iodated heavy metal phases, such as lead iodide, zinc iodide, and bismuth oxyiodides. Upon sintering, the bismuth (and to some extent the zinc) containing species produced pellets that were mechanically robust. However, the lead-based materials did not sinter properly and the resulting pellets seemed comparatively weak (mechanically). This is of interest for processing since mechanical, thermal, and chemical stability are all items of concern in a long-term waste repository.

To date, the low temperature glass obtained from Ferro (EG 2998), which contained both Bismuth and Zinc, did flux the AgI-loaded mordenite; whereas the lead containing glasses CF 1217 and EG 2928 did not. It has not yet been determined whether fully-fluxed, or minimally-fluxed, AgI-loaded zeolite is a preferred waste form. We have determined, for example, that if a homogeneous waste is desired, then AgI-MOR loaded at as much as up to 25% (w/w) in Ferro glass EG 2998 is a good candidate. Conversely, if a heterogeneous waste form is deemed more acceptable for long term storage, then either CF 1417 or EG 2928 would be more attractive candidates. It is quite probable that the maximum loading capacity for AgI-MOR in a LST glass is higher than 25 weight percent, and that increasing this percentage would be a logical next step to pursue. Additionally, the durability and stability tests on these materials need to be performed. With Bi-containing glasses, we see the potential for highly durable waste forms that can incorporate large quantities (by weight) of AgI alone or Ag-1-Zeolite into the glass.

An unexpected discovery from this work is that AgI alone (i.e., no zeolite added), can be incorporated into, and encapsulated by, the low-sintering-temperature glasses described above that sinter at temperatures around 500° C. This is a very useful result, because AgI begins to vaporize at about 550° C. Hence, having a glass that sinters and densifies at temperatures below 550° C. is important to the success of the present invention.

The successful formulations of the present invention are particularly unexpected because: (1) many glasses that are based on the materials tested simply cannot accommodate any appreciable amount of iodine in their structure and, (2) it is unexpected that the loading would be high enough that the bulk material could be useful as a waste form, whereas relatively high iodine loadings are needed to both keep the physical size of the resulting waste relatively small and keep down the cost down for the chemicals needed to carry out the process. Other things that are considered unexpected are that: (a) we were able to find a silicon-based glass that was actually able to dissolve both the silver and iodine; (b) that the glasses which did not dissolve the silver and iodine were actually able to coat the Ag—I-zeolite pellets so very effectively, thereby cutting off access to the encapsulated Ag—I-zeolite, and precluding the iodine from being released during leach testing; and (c) that any of the LST glasses were able to stand up to being exposed to warm water (note: the contrary expected result of LST melting point glasses is that they hydrate and disintegrate quite quickly in warm water).

In fact, we have even found it is possible to produce a homogeneous glass when equal weights of glass frit and AgI are mixed together. Hence, this shows, unexpectedly, that the capacity of this material for iodine is much higher than the specifications that are usually given for the iodine-containing waste materials. The glassy waste forms can be formed into large cohesive blocks or ingots suitable for long term storage or geologic sequestration without being concerned that the material would be dispersed as a powder.

We studied compositions comprising 3 different weight percentage amounts of AgI (or AgI-zeolite), i.e., 25 wt %, 40 wt %, or 50 wt %, with the remaining balance comprising the LST glass.

Initial analysis of leach testing (DI water, ten days, 90° C.) of Bi-containing glasses indicated minimal degradation of the samples after exposure. SEM studies did, how ever reveal a thin alteration rind forming on the surface comprised of phases similar to those formed in the "1-10 Series" Bi—I—O layered phases discussed below. Given that the "1-10 Series" materials effectively sequestered iodine suggests the possibility of either (or both): (1) fabricating leach resistant ceramic waste forms using amorphous oxides in concert with the AgI or AgI-zeolite capture material; and/or (2) designing the Bi—I—O sequestration material so that if leaching does occur from the glassy binder, the Bi—I—O will sequester any additional Iodine release.

Studies to date have shown that low melting point glasses containing bismuth, among other elements, can provide a leach resistant matrix for encapsulating or incorporating (by fluxing) iodine captured on a silver-loaded zeolite substrate. It was also found that when such materials were exposed to water, negligible iodine was released and, unexpectedly, a surface alteration layer formed on the glassy material that was rich in a bismuth oxide/hydroxide material. Such materials have a significant record (see below) of being effective sequestering agents for iodine (so that it is not easily released to groundwater, and then to the "accessible environment"). In some embodiments, the LST glass composition could be deliberately adjusted so that an optimal type of bismuth oxide/hydroxide surface conversion layer is encouraged to grow naturally. Alternatively, such a coating could be deliberately deposited on to, or pre-formed in place, after the sintering step has been completed (See, e.g., FIGS. 12-15). Such a "scavenger" coating would serve as a secondary barrier to prevent dispersal of any iodine that might be leached out from the primary (LST glass+iodine-loaded material) sintered waste form.

Bismuth-Oxy-Iodine Compounds

In some embodiments of the present invention, one or more bismuth-oxy-iodine compounds can serve as substitutes to replace, or augment, the use of silver-based adsorbents (e.g., AgI, AgI-zeolite). In this embodiment, the LST glasses described above are mixed (e.g., as powdered frits) with particles/powders of at least one bismuth-oxy-iodine compound, and then sintered together to make an iodine-loaded glassy solid waste form when cooled. Hence, the iodine-loaded waste form comprises bismuth-oxy-iodine that is encapsulated by the sintered LST glass. Note also that the term "bismuth-oxy-iodine compound" is defined herein to include bismuth-oxy-iodide and bismuth-oxy-iodate compounds.

Figure 12:
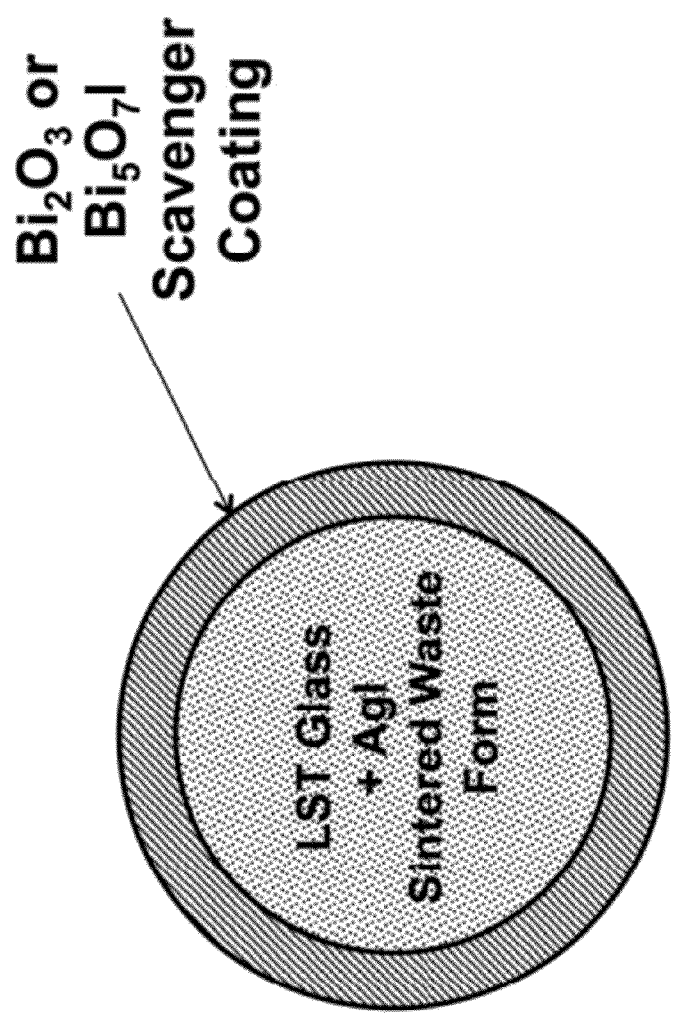
FIG. 12 shows a schematic cross-section of a waste form comprising sintered Low-sintering-temperature glass and AgI, surrounded by a coating of a bismuth-oxide based scavenger material comprising $Bi_2O_3$ or $Bi_xO_yI_z$.

A variety of different waste form configurations could be manufactured that incorporate Bi—O—I compounds, including the following four examples. FIG. 12 shows a schematic cross-section of a waste form comprising sintered LST glass+AgI, surrounded by a protective coating comprising a bismuth-oxide based scavenger material comprising $Bi_2O_3$ or $Bi_5O_7I$.

Figure 13:
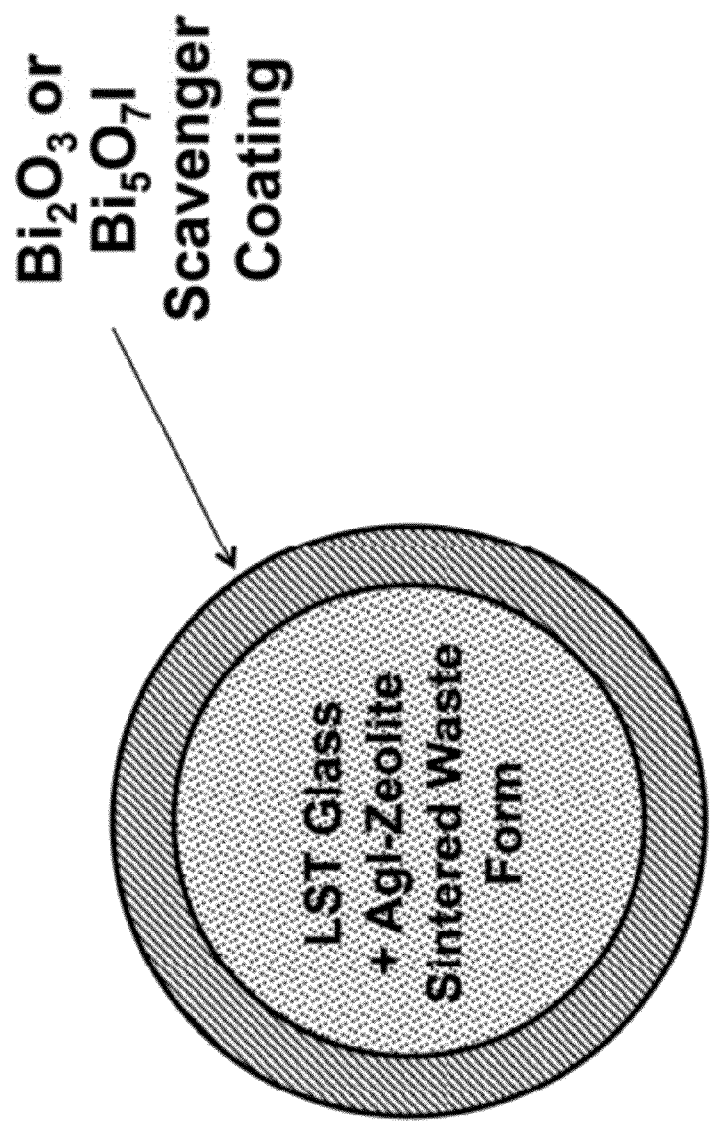
FIG. 13 shows a schematic cross-section of a waste form comprising sintered Low-sintering-temperature glass and AgI-Zeolite, surrounded by a coating of a bismuth-oxide based scavenger material comprising $Bi_2O_3$ or $Bi_xO_yI_z$.
Figure 14:
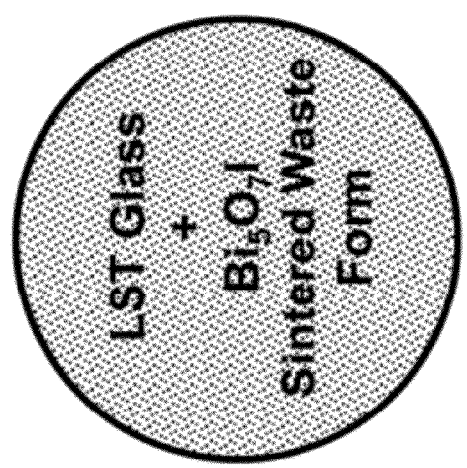
FIG. 14 shows a schematic cross-section of a waste form comprising sintered Low-sintering-temperature glass and $Bi_xO_yI_z$.

FIG. 13 shows a schematic cross-section of a waste form comprising sintered LST glass+AgI-Zeolite, surrounded by a protective coating of a bismuth-oxide based scavenger material comprising $Bi_2O_3$ or $Bi_5O_7I$. FIG. 14 shows a schematic cross-section of a waste form comprising sintered LST glass+$Bi_5O_7I$. FIG. 15 shows a schematic cross-section of a waste form comprising sintered LST glass+$Bi_5O_7I$, surrounded by a protective scavenger coating of bismuth-oxide, $Bi_2O_3$.

Because BiOI decomposes at temperatures ranging from 250° C. to 480° C., this material is not suitable for being mixed with LST glass and sintered at a temperature ranging from 425° C. to 550° C. However, it is believed that $Bi_5O_7I$ is stable to temperatures greater than 550° C., which does make it a suitable iodine-capturing material for this application. However, if any other members of the Bismuth Iodate (Bi—I—O) phase space turn out to be thermally stable above 550° C., then they would most likely make suitable iodine-capturing materials for mixing with LST glasses and sintering between 425° C. to 550° C. for the formation of long term waste forms.

The term "about", as it is used to modify a temperature (e.g., the sintering temperature), means a variance +/−10° C. from the stated temperature.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. An iodine-loaded waste form, comprising a glassy body comprised of a mixture of a LST (Low-Sintering-Temperature) glass and an iodine-loaded material;
wherein the LST glass has a sintering temperature that ranges from 425° C. to 550° C.;
wherein the LST glass comprises bismuth oxide and at least one element selected from the group consisting of oxides of Pb, Bi, Zn and B; and
wherein the iodine-loaded material is selected from the group consisting of AgI, AgI-zeolite, Ag-silica aerogel, $ZnI_2$, CuI, and a bismuth-oxy-iodine compound having a thermal decomposition temperature greater than the sintering temperature of the LST glass.

2. The iodine-loaded waste form of claim 1, wherein the iodine comprises radioactive iodine.

3. The iodine-loaded waste form of claim 1, wherein the LST glass comprises boron and bismuth.

4. The iodine-loaded waste form of claim 3, wherein the LST glass comprises boron, bismuth, and zinc; and has a sintering temperature of about 500° C.

5. The iodine-loaded waste form of claim 4, wherein the LST glass comprises 51-55 wt % Bi, 21-22 wt % Zn, and 3-4 wt % B, with the remainder comprising O, and comprising essentially no lead or silicon.

6. The iodine-loaded waste form of claim 5, wherein the iodine-loaded material comprises AgI-zeolite, and the zeolite comprises Mordenite zeolite.

7. The iodine-loaded waste form of claim 1, wherein the iodine-loaded material comprises AgI, and the concentration of AgI in the waste form ranges from 20 wt % to 60 wt % AgI.

8. The iodine-loaded waste form of claim 1, wherein the AgI is homogeneously dissolved throughout the iodine-loaded waste form.

9. The iodine-loaded waste form of claim 1, wherein the iodine-loaded material comprises AgI-zeolite, and the zeolite comprises Mordenite zeolite.

10. The iodine-loaded waste form of claim 1, wherein the iodine-loaded material comprises a bismuth-oxy-iodine compound having a thermal decomposition temperature greater than 550° C.

11. The iodine-loaded waste form of claim 10, wherein the bismuth-oxy-iodine compound comprises $Bi_5O_7I$.

12. The iodine-loaded waste form of claim 1, wherein the iodine-loaded waste form is surrounded by a protective coating comprising $Bi_2O_3$.

13. The iodine-loaded waste form of claim 1, wherein the iodine-loaded waste form is surrounded by a protective coating comprising $Bi_5O_7I$.

14. An iodine-loaded waste form, comprising a glassy body comprised of a mixture of a LST (Low-Sintering-Temperature) glass and an iodine-loaded material;
wherein the LST glass comprises 51-55 wt % Bi, 21-22 wt % Zn, and 3-4 wt % B, with the remainder comprising O, and comprising essentially no lead or silicon;
wherein the LST glass has a sintering temperature of about 500° C.;
wherein the iodine-loaded material comprises AgI-zeolite; and
wherein the zeolite comprises Mordenite zeolite.

15. A method of forming a glassy iodine-loaded waste form, comprising:
a) mixing powdered frits of a LST (Low-Sintering-Temperature) glass with particles or powders of an iodine-loaded material, wherein the LST glass comprises bismuth oxide and at least one element selected from the group consisting of oxides of Pb, Bi, Zn and B; and wherein the iodine-loaded material is selected from the group consisting of AgI, AgI-zeolite, Ag-silica aerogel, $ZnI_2$, CuI, and a bismuth-oxy-iodine compound having a thermal decomposition temperature greater than the sintering temperature of the LST glass.
b) heating the mixture in an oxidizing environment at a temperature that ranges from 425° C. to 550° C., which sinters and densifies the mixture; and then
c) cooling the sintered mixture.

16. The method of claim 15, wherein the iodine comprises radioactive iodine.

17. The method of claim 15, wherein the LST glass comprises boron and bismuth.

18. The method of claim 17, wherein the LST glass comprises boron, bismuth, and zinc; and has a sintering temperature of about 500° C.

19. The method of claim 15, wherein the concentration of AgI in the waste form ranges from 20 wt % to 60 wt % AgI.

20. The method of claim 15, wherein the LST glass comprises 51-55 wt % Bi, 21-22 wt % Zn, and 3-4 wt % B, with the remainder comprising O, and comprising essentially no lead or silicon.

21. The method of claim 20, wherein the iodine-loaded material comprises AgI-zeolite, and the zeolite comprises Mordenite zeolite.

22. The method of claim 15, wherein the AgI is homogeneously dissolved throughout the iodine-loaded waste form.

23. The method of claim 15, wherein the iodine-loaded material comprises AgI-zeolite, and the zeolite comprises Mordenite zeolite.

24. The method of claim 15, wherein the iodine-loaded material comprises a bismuth-oxy-iodine compound having a thermal decomposition temperature greater than 550° C.

25. The method of claim 15, wherein the bismuth-oxy-iodine compound comprises $Bi_5O_7I$.

26. The method of claim 15, further comprising after step c) surrounding the glassy iodine-loaded waste form with a protective coating comprising $Bi_2O_3$.

27. The method of claim 15, further comprising after step c) surrounding the glassy iodine-loaded waste form with a protective coating comprising $Bi_5O_7I$.

* * * * *